(12) United States Patent
Feng

(10) Patent No.: US 11,287,920 B2
(45) Date of Patent: Mar. 29, 2022

(54) TOUCH CONTROL SCREEN

(71) Applicant: WUHAN CHINA STAR OPTOELECTRONICS SEMICONDUCTOR DISPLAY TECHNOLOGY CO., LTD., Wuhan (CN)

(72) Inventor: Xiaoliang Feng, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 294 days.

(21) Appl. No.: 16/472,324

(22) PCT Filed: Feb. 21, 2019

(86) PCT No.: PCT/CN2019/075705
§ 371 (c)(1),
(2) Date: Jun. 21, 2019

(87) PCT Pub. No.: WO2020/155225
PCT Pub. Date: Aug. 6, 2020

(65) Prior Publication Data
US 2021/0333967 A1 Oct. 28, 2021

(30) Foreign Application Priority Data
Jan. 29, 2019 (CN) .......................... 201910085377.4

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04102* (2013.01);
(Continued)

(58) Field of Classification Search
CPC ............... G06F 3/04164; G06F 3/0446; G06F 2203/04102; G06F 2203/04103; G06F 2203/04111
(Continued)

(56) References Cited

U.S. PATENT DOCUMENTS

2014/0253830 A1* 9/2014 Li .......................... G06F 3/0443
349/12
2016/0037609 A1* 2/2016 Ka .......................... G06F 3/041
313/511
(Continued)

FOREIGN PATENT DOCUMENTS

CN 104199570 A 12/2014
CN 207800055 U 8/2018
(Continued)

*Primary Examiner* — Mark Edwards

(57) ABSTRACT

A touch control screen includes a flexible substrate including a touch control area, a routing area and a bonding area, wherein a plurality of bending passages is disposed between the touch control area and the routing area; a first electrode chain and a second electrode chain are intersected with and insulated from each other and located in the touch control area; a signal wire is electrically connected to the first electrode chain or the second electrode chain at one end, and extended to the bonding area at the other end. Parts of the flexible substrate corresponding to the routing area and the bonding area are bent in respect to the bending passages to the back of the flexible substrate at positions corresponding to the touch control area.

14 Claims, 5 Drawing Sheets

(52) U.S. Cl.
CPC ............. *G06F 2203/04103* (2013.01); *G06F 2203/04111* (2013.01)

(58) Field of Classification Search
USPC ........................................ 345/174
See application file for complete search history.

(56) References Cited

U.S. PATENT DOCUMENTS

| | | | |
|---|---|---|---|
| 2017/0075464 A1 | 3/2017 | Ahn | |
| 2018/0024666 A1* | 1/2018 | Marques | G06F 3/04166 345/174 |
| 2018/0068919 A1* | 3/2018 | Chung | H01L 23/31 |

FOREIGN PATENT DOCUMENTS

| | | |
|---|---|---|
| CN | 108598142 A | 9/2018 |
| CN | 208351439 U | 1/2019 |

\* cited by examiner

TOUCH CONTROL SCREEN

FIELD OF INVENTION

The present application relates to the technical field of touch control, and especially to a touch control screen.

BACKGROUND OF INVENTION

As the new products of iPhone X and Samsung Galaxy launch, the trend of full display leaded by them becomes a mainstream in the industry, and various technologies— narrow borders, edge displays, U-Cut full displays, etc.— compete with each other to provide a fascination that triggers an uproar in the consumption market. A full display design can increase the screen-to-body ratio, and the decrease of the inactive area enables the users to have a better visual experience. However, the so-called full display designs of the conventional technologies are all related to the technical category of narrow border designs. Most of them realize full display designs by shrinking the space of the borders. Because the existence of wirings, driving circuits, sealant, etc. in the borders is inevitable, a real full display still cannot be attained.

Therefore, conventional technologies have drawbacks and an improvement is desired.

SUMMARY OF INVENTION

An embodiment of the present application provides a touch control screen that significantly decreases the space occupied by the border in the front of the touch control screen and therefore overcomes the problem of lower screen-to-body ratio caused by the existence of the border such that a full display design can be realized.

The present application provides a touch control screen including: a flexible substrate including a touch control area, a routing area located around the touch control area, and a bonding area located on one side of the touch control area, wherein a plurality of bending passages is disposed between the touch control area and the routing area; a first electrode chain and a second electrode chain intersected with and insulated from each other and located in the touch control area; a signal wire electrically connected to the first electrode chain or the second electrode chain at one end, and extended to the bonding area at the other end; wherein parts of the flexible substrate corresponding to the routing area and the bonding area are bent in respect to the bending passages to the back of the flexible substrate at positions corresponding to the touch control area.

According to the touch control screen of the present application, a wire transition area is disposed between the bending passages and the touch control area, a width of the wire transition area is less than or equal to 0.1 mm, and a width of each of the bending passages is between 0.2 mm-4 mm.

According to the touch control screen of the present application, adjacent two of the bending passages are intersected with each other, and the bending passages extend through the flexible substrate.

According to the touch control screen of the present application, the routing area includes a first routing area, a second routing area, a third routing area and a fourth routing area, the bending passages include a first bending passage, a second bending passage, a third bending passage and a fourth bending passage, and parts corresponding to the first routing area and the third routing area on the opposite sides of the flexible substrate are bent to the back of the flexible substrate respectively through the first bending passage and the third bending passage, and other parts corresponding to the second routing area and the fourth routing area on the other sides of the flexible substrate are bent to the back of the flexible substrate respectively through the second bending passage and the fourth bending passage.

According to the touch control screen of the present application, a conductive pad is disposed in the part of each of the first routing area and the third routing area on a side of each of the second bending passage and the fourth bending passage, and the conductive pad is disposed corresponding to the signal wire to realize an electrical connection of the signal wire on the side of each of the second bending passage and the fourth bending passage after bending.

According to the touch control screen of the present application, a width of the vertical projection of the conductive pad on the flexible substrate is greater than a width of the vertical projection of the signal wire on the flexible substrate.

According to the touch control screen of the present application, the touch control screen includes a touch control layer, a first insulation layer, a bridging layer and a second insulation layer stacking one another in order on the flexible substrate, and the touch control layer includes the first electrode chain and the second electrode chain, and wherein a bridging hole is disposed in the first insulation layer on the touch control area, two adjacent first electrodes of the first electrode chain realize an electrical connection by the bridging layer through the bridging hole, a recess is disposed in the first insulation layer at a position of the bending passage, and an organic flexible insulation film layer is filled in the recess.

According to the touch control screen of the present application, the touch control screen further includes an electrode outlet wire manufactured in the same layer as the touch control layer, and one end of the electrode outlet wire is directly connected to the first electrode chain or the second electrode chain, and the other end of the electrode outlet wire extends to the routing area, and wherein the electrode outlet wire breaks off at a position of the bending passage, a wire switching hole is disposed in the first insulation layer on each side of one of the bending passages corresponding to a position of the electrode outlet wire, and the electrode outlet wire on each side of the bending passage realizes an electrical connection by a transition wire manufactured in the same layer as the bridging layer through the wire switching holes.

According to the touch control screen of the present application, the signal wire is manufactured in the same layer as the bridging layer and is electrically connected to the electrode outlet wire through another wire switching hole in the first insulation layer.

According to the touch control screen of the present application, the wire switching hole on the side of the bending passage closer to the touch control area is located in the wire transition area.

The present application further provides a touch control screen including: a flexible substrate including a touch control area, a routing area located around the touch control area, and a bonding area located on one side of the touch control area, wherein a plurality of bending passages is disposed between the touch control area and the routing area; a first electrode chain and a second electrode chain intersected with and insulated from each other and located in the touch control area; a signal wire electrically connected to the first electrode chain or the second electrode chain at one end, and extended to the bonding area at the other end; wherein parts of the flexible substrate corresponding to the routing area and the bonding area are bent in respect to the bending passages to the back of the flexible substrate at positions corresponding to the touch control area, and the parts of the flexible substrate corresponding to the routing area have overlapping in portions at four corners corresponding to the touch control area after bending.

According to the touch control screen of the present application, a wire transition area is disposed between the bending passages and the touch control area, a width of the wire transition area is less than or equal to 0.1 mm, and a width of each of the bending passages is between 0.2 mm-4 mm.

According to the touch control screen of the present application, adjacent two of the bending passages are intersected with each other, and the bending passages extend through the flexible substrate.

According to the touch control screen of the present application, the routing area includes a first routing area, a second routing area, a third routing area and a fourth routing area, the bending passages include a first bending passage, a second bending passage, a third bending passage and a fourth bending passage, and parts corresponding to the first routing area and the third routing area on the opposite sides of the flexible substrate are bent to the back of the flexible substrate respectively through the first bending passage and the third bending passage, and other parts corresponding to the second routing area and the fourth routing area on the other sides of the flexible substrate are bent to the back of the flexible substrate respectively through the second bending passage and the fourth bending passage.

According to the touch control screen of the present application, a conductive pad is disposed in the part of each of the first routing area and the third routing area on a side of each of the second bending passage and the fourth bending passage, and the conductive pad is disposed corresponding to the signal wire to realize an electrical connection of the signal wire on the side of each of the second bending passage and the fourth bending passage after bending.

According to the touch control screen of the present application, a width of the vertical projection of the conductive pad on the flexible substrate is greater than a width of the vertical projection of the signal wire on the flexible substrate.

According to the touch control screen of the present application, the touch control screen includes a touch control layer, a first insulation layer, a bridging layer and a second insulation layer stacking one another in order on the flexible substrate, and the touch control layer includes the first electrode chain and the second electrode chain, and wherein a bridging hole is disposed in the first insulation layer on the touch control area, two adjacent first electrodes of the first electrode chain realize an electrical connection by the bridging layer through the bridging hole, a recess is disposed in the first insulation layer at a position of the bending passage, and an organic flexible insulation film layer is filled in the recess.

According to the touch control screen of the present application, the touch control screen further includes an electrode outlet wire manufactured in the same layer as the touch control layer, and one end of the electrode outlet wire is directly connected to the first electrode chain or the second electrode chain, and the other end of the electrode outlet wire extends to the routing area, and wherein the electrode outlet wire breaks off at a position of the bending passage, a wire switching hole is disposed in the first insulation layer on each side of one of the bending passages corresponding to a position of the electrode outlet wire, and the electrode outlet wire on each side of the bending passage realizes an electrical connection by a transition wire manufactured in the same layer as the bridging layer through the wire switching holes.

According to the touch control screen of the present application, the signal wire is manufactured in the same layer as the bridging layer and is electrically connected to the electrode outlet wire through another wire switching hole in the first insulation layer.

According to the touch control screen of the present application, the wire switching hole on the side of the bending passage closer to the touch control area is located in the wire transition area.

DESCRIPTION OF DRAWINGS

The present application will become more fully understood from the following detailed description and the accompanying drawings which are given by way of illustration only and thus are not limitative of the present application and wherein.

DETAILED DESCRIPTION OF PREFERRED EMBODIMENTS

Figure 1:
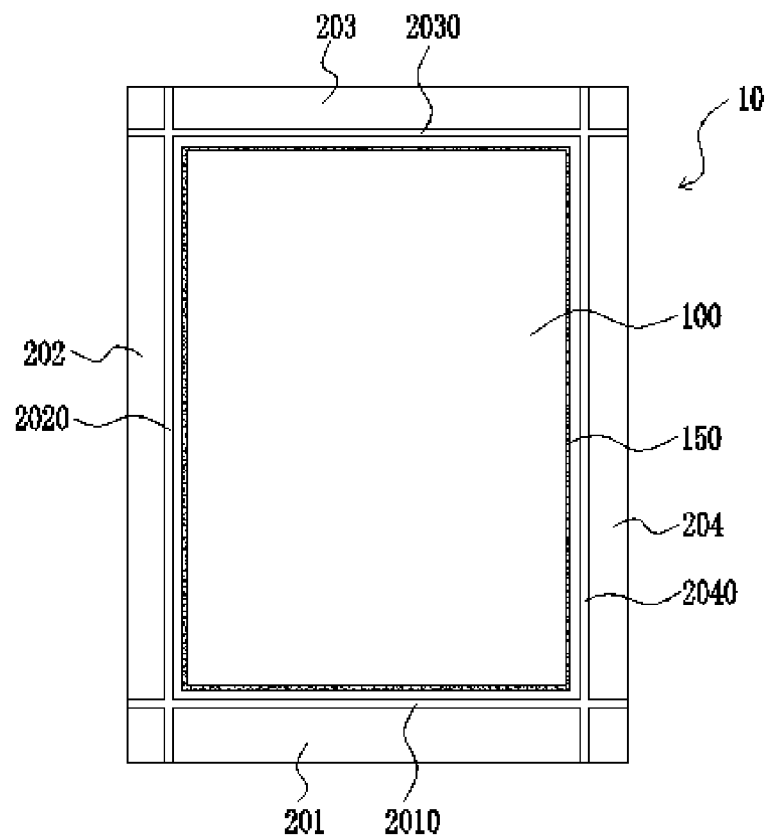
FIG. 1 is a front view of a touch control screen in an unbent state, according to an embodiment of the present application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present application directs to conventional touch control screens and overcomes the technical problem of a degraded screen-to-body ratio caused by the existence of border wires, driving circuits, sealant, etc.

FIG. 1 is a front view of the touch control screen in an unbent state, according to an embodiment of the present application. The touch control screen includes a flexible substrate 10 including a touch control area (display area) 100, a routing area (including 201, 202, 203, 204) located around the touch control area 100, and a bonding area (as 90 shown in FIG. 6) located on one side of the touch control area 100, wherein a plurality of bending passages (including 2010, 2020, 2030, 2040) is disposed between the touch control area 100 and the routing area. A first electrode chain (as 210 shown in FIG. 6) and a second electrode chain (as 220 shown in FIG. 6) are intersected with and insulated from each other and located in the touch control area 100. A signal wire is arranged in the routing area, electrically connected to the first electrode chain and the second electrode chain, and extended to the bonding area at the other end. The routing area includes a first routing area 201, a second routing area 202, a third routing area 203, and a fourth routing area 204. The plurality of bending passages includes a first bending passage 2010, a second bending passage 2020, a third bending passage 2030, and a fourth bending passage 2040. Adjacent two of the bending passages are intersected with each other, and the first bending passage 2010, the second bending passage 2020, the third bending passage 2030 and the fourth bending passage 2040 all extend through the flexible substrate 10.

A wire transition area 150 is disposed between the bending passages and the touch control area 100, and the wire transition area 150 encloses the touch control area 100 and is used for transition of the signal wire.

In one embodiment, a width of the wire transition area 150 is less than or equal to 0.1 mm, and considering the thickness of the touch control screen, a width of each of the bending passages is between 0.2 mm-4 mm.

In another embodiment, a width of each of the bending passages is between 1 mm-2 mm, and in particular, has a specific size such as 1 mm, 1.5 mm, 2 mm, etc.

Parts of the flexible substrate 10 corresponding to the routing area and the bonding area are bent in respect to the bending passages to the back of the flexible substrate 10 at positions corresponding to the touch control area 100. First, in particular, parts on opposite sides of the flexible substrate 10 corresponding to the first routing area 201 and the third routing area 203 are bent to the back of the flexible substrate 10 respectively through the first bending passage 2010 and the third bending passage 2030, and then parts on the other sides of the flexible substrate 10 corresponding to the second routing area 202 and the fourth routing area 204 are bent to the back of the flexible substrate 10 respectively through the second bending passage 2020 and the fourth bending passage 2040. Meanwhile, as the bonding area is located beside one of the routing areas, the bonding area is also bent to the back of the flexible substrate 10.

Figure 2:
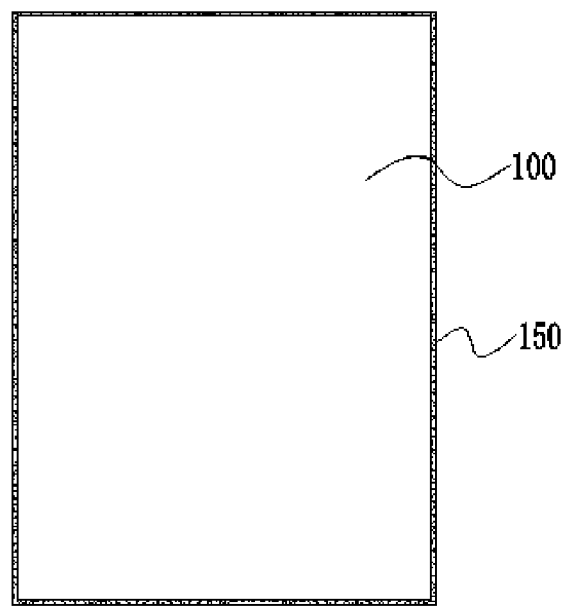
FIG. 2 is a front view of the touch control screen in a bent state, according to the embodiment of the present application.
Figure 3:
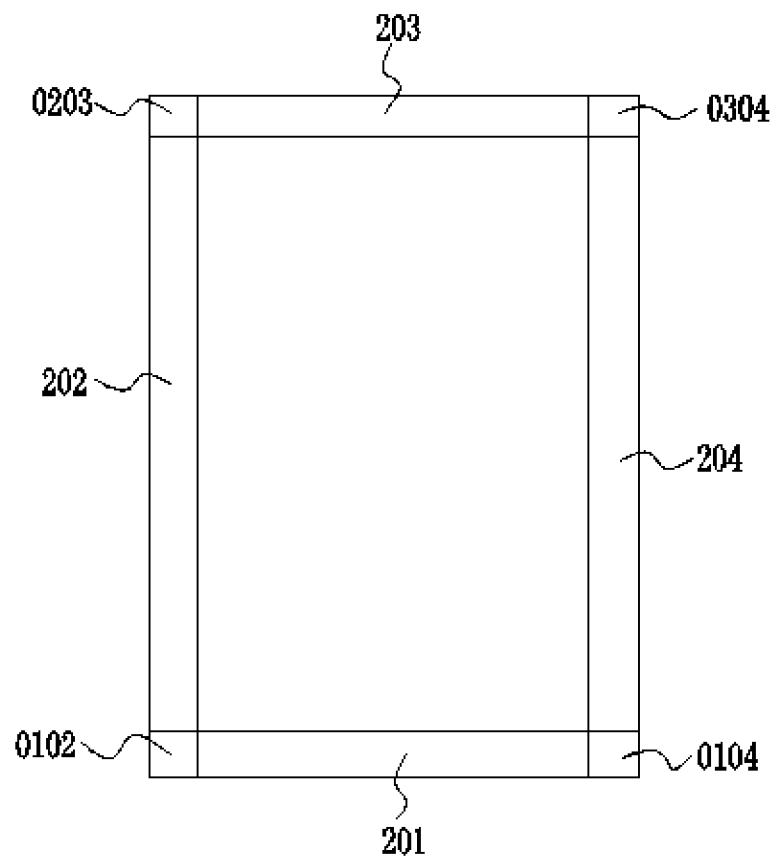
FIG. 3 is a rear view of the touch control screen in a bent state, according to the embodiment of the present application.

FIG. 2 is a front view of the touch control screen provided by the embodiment of the present application after bending. Only the touch control area (display area) 100 and the surrounding wire transition area 150 are preserved in the front of the touch control screen after bending. Because the width of the wire transition area 150 is very thin, the screen-to-body ratio can reach more than 99%. The first routing area 201, the second routing area 202, the third routing area 203 and the fourth routing area 204 are all bent to the back of the touch control area 100 in respective to the bending passages (as shown in FIG. 3) and securely affixed to the back of the touch control screen. The touch control screen is securely affixed to the back of the display screen when they are assembled together. The first routing area 201 is overlapped with the second routing area 202 and the fourth routing area 204 respectively and correspondingly forms a first overlapping area 0102 and a fourth overlapping area 0104. The third routing area 203 is also overlapped with the second routing area 202 and the fourth routing area 204 respectively and correspondingly forms a second overlapping area 0203 and a third overlapping area 0304. With the existence of the bending passages, the overlapping areas (0102, 0104, 0203 and 0304) do not have wrinkles and the reliability of bending is increased.

Figure 4:
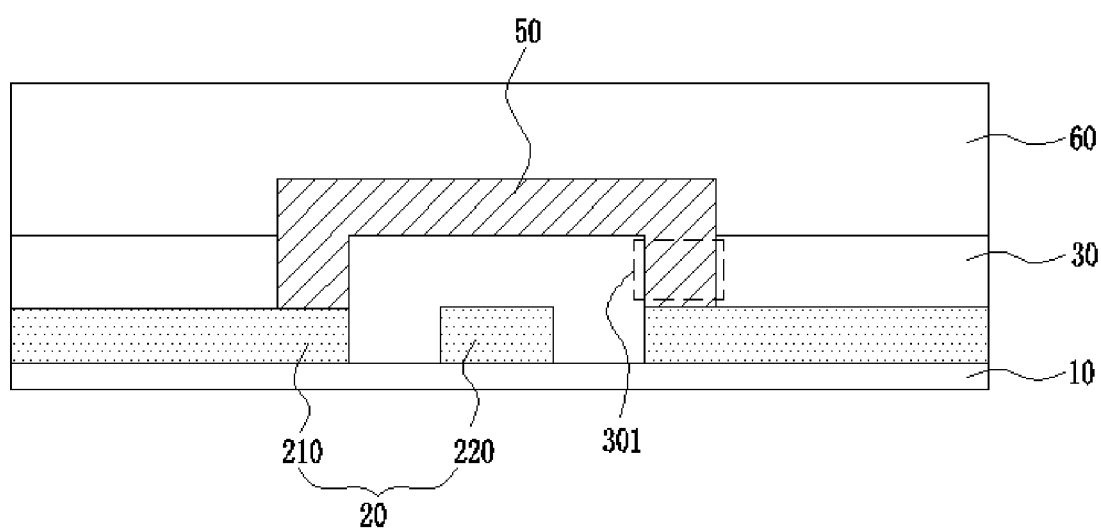
FIG. 4 is a schematic diagram of a structure of the touch control screen, according to the embodiment of the present application.

FIG. 4 is a schematic diagram of the structure of the touch control screen provided by the embodiment of the present application. The touch control screen includes a touch control layer 20, a first insulation layer 30, a bridging layer 50 and a second insulation layer 60 stacking one another in order on the flexible substrate 10. The touch control layer 20 includes the first electrode chain 210 and the second electrode chain 220 insulated from each other. The first electrode chain 210 includes a first electrode, and the second electrode chain 220 includes a second electrode. A bridging hole 301 is defined in the first insulation layer 30 on the touch control area 100, two adjacent first electrodes of the first electrode chain 210 realize an electrical connection by the bridging layer 50 through the bridging hole 301, and two adjacent second electrodes of the second electrode chain 220 connect directly through a metal in the same layer as the touch control layer 20.

In one embodiment, the first electrode is a touch control electrode, and the second electrode is a sensing electrode.

Figure 5:
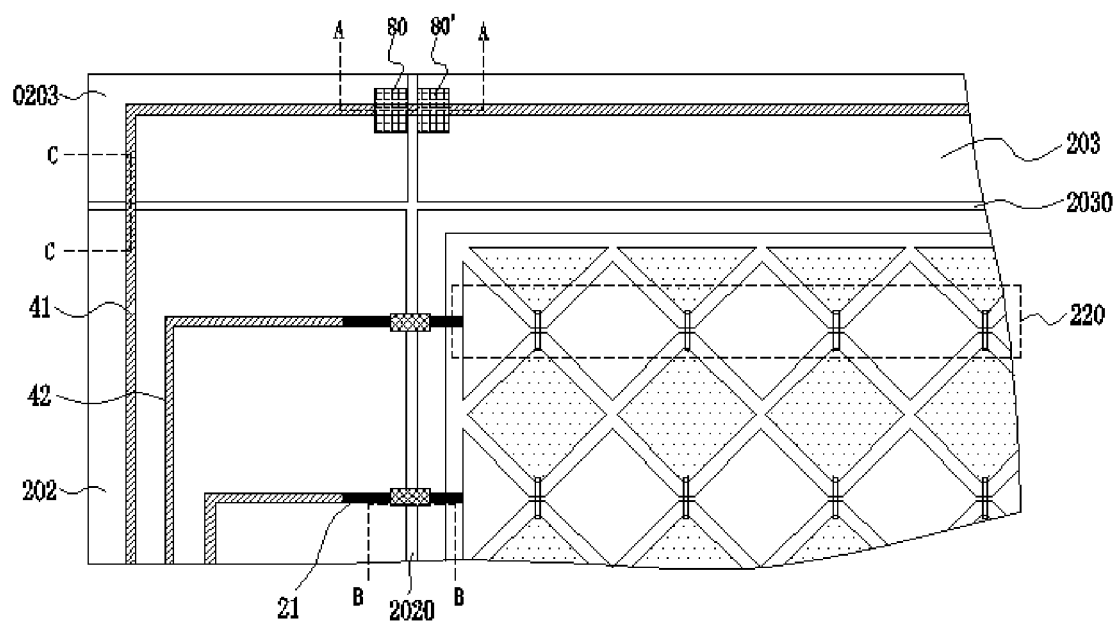
FIG. 5 is a partially schematic diagram of the touch control screen in an unbent state, according to the embodiment of the present application.

FIG. 5 is a partially schematic diagram of the touch control screen provided by the embodiment of the present application before bending. The signal wiring includes a ground wire 41 and a second wire 42 electrically connected to the second electrode chain 220. A part of the ground wire 41 extends along the second routing area 202, across the third bending passage 2030, and into the second overlapping area 0203. Then the ground wire 41 continues to extend across the second bending passage 2020 and into the third routing area 203. Although only a part of the ground wire 41 is shown in FIG. 5, the ground wire 41 can also be arranged in other routing areas. A conductive pad is disposed in the part of the third routing area 203 on a side of each of the second bending passage 2020 and the fourth bending passage 2040 (not shown). The conductive pad includes a first conductive pad 80 and a second conductive pad 80' disposed in a mirror symmetry. The conductive pad is disposed corresponding to the signal wiring to realize an electrical connection of the signal wiring on the side of each of the second bending passage 2020 and the fourth bending passage 2040 after bending such that an electrical connection can be secured when bending.

Figure 7:
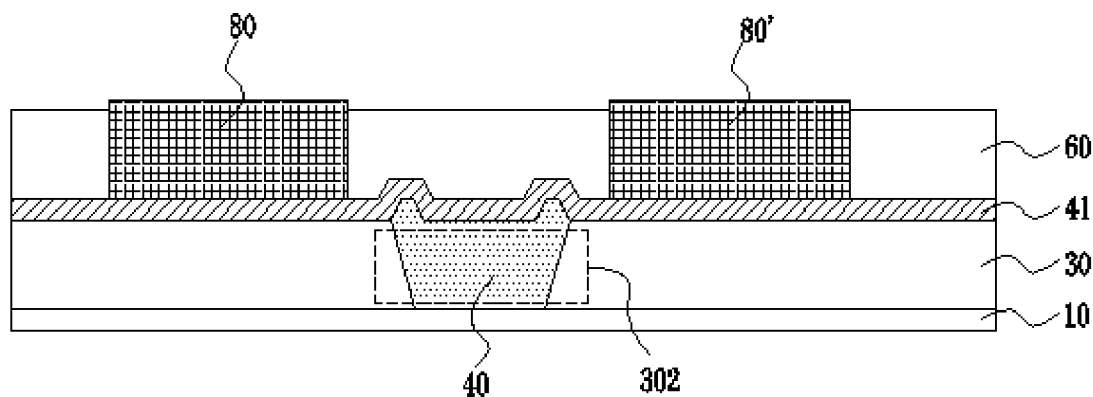
FIG. 7 is a sectional view taken along line A-A of FIG. 5.

Referring together to FIG. 7, FIG. 7 is a sectional view taken along line A-A of FIG. 5. A recess 302 is disposed in the first insulation layer 30 at positions corresponding to the first bending passage 2010, the second bending passage 2020, the third bending passage 2030 and the fourth bending passage 2040. An organic flexible insulation film layer 40 is filled in the recess 302 for bending. The signal wiring has a curved shape at positions corresponding to the bending passages. During the course of bending the signal wiring would be stretched, and the curved design prevents damage of the signal wiring when bending. The ground wire 41 is illustrated in FIG. 7. The first conductive pad 80 and the second conductive pad 80' are disposed respectively at sides of the recess 302 and at a position corresponding to the ground wire 41. The position of the second bending passage 2020 needs to be bent inward, and because the signal wiring is protected by the second insulation layer 60 above, a layer of organic conductive film with a larger area than that of the first conductive pad 80 and the second conductive pad 80' and arranged on both sides of the second bending passage 2020 is needed to be manufactured on the signal wiring for an electrical connection of the signal wiring to be realized after bending. The spacing of the wires in the signal wiring becomes lager at the position of bending to adapt the dimensions of the conductive pad, and the signal wiring resumes its spacing between the wires along the extending direction of the third routing area 203 after wire transition. A width of the vertical projection of the conductive pad on the flexible substrate 10 is greater than a width of the vertical projection of the signal wire on the flexible substrate 10.

In one embodiment, the conductive pad is two times or more the width of the signal wire.

Figure 8:
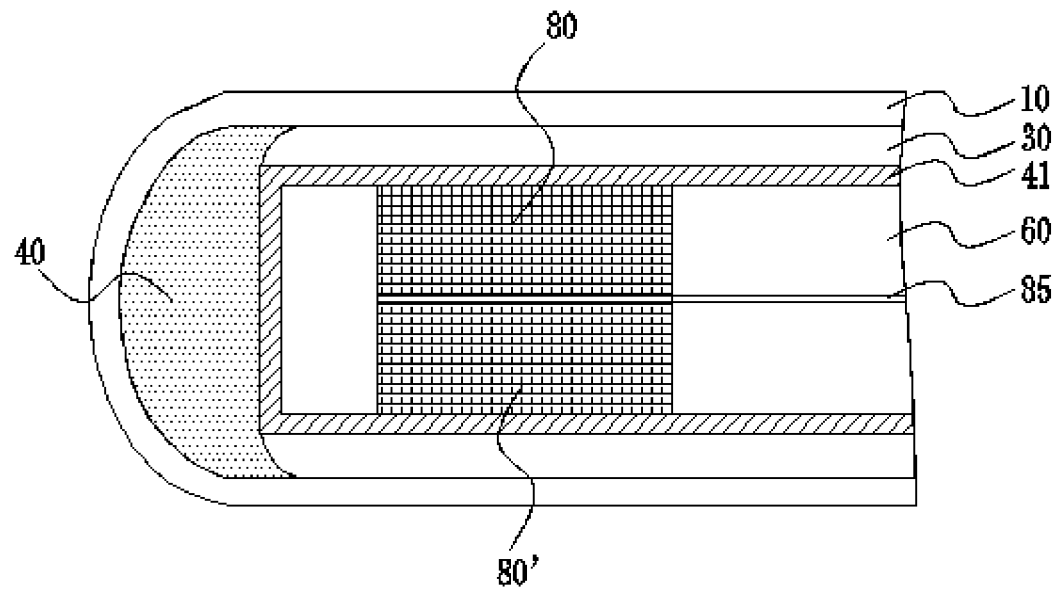
FIG. 8 is a view similar to FIG. 7 with the touch screen of FIG. 7 being folded.

Referring together to FIG. 8, FIG. 8 is a schematic diagram of the consequence of FIG. 7 after bending. After bending, the first conductive pad 80 faces the second conductive pad 80', and the first conductive pad 80 and the second conductive pad 80' bond together through a conductive adhesive layer 85.

Figure 9:
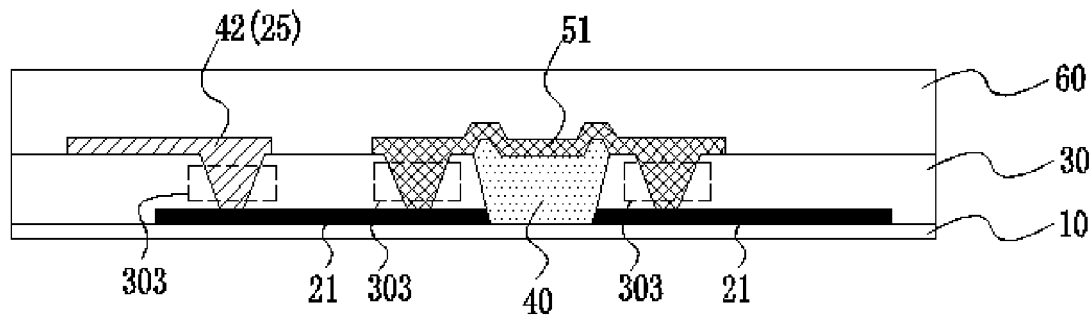
FIG. 9 is a sectional view taken along line B-B of FIG. 5.

As shown in FIG. 5, the touch control screen further includes an electrode outlet wire 21 manufactured in the same layer as the touch control layer. One end of the electrode outlet wire 21 is directly connected to the second electrode chain 220, and the other end of the electrode outlet wire 21 extends to the second routing area 202 and is electrically connected to the second wire 42. Referring together to FIG. 9, FIG. 9 is a sectional view taken along line B-B of FIG. 5. The electrode outlet wire 21 breaks off at a position of the second bending passage 2020, a wire switching hole 303 is disposed in the first insulation layer 30 on each side of the second bending passage 2020 corresponding to a position of the electrode outlet wire 21, and the electrode outlet wire 21 on each side of the second bending passage 2020 realizes an electrical connection by a transition wire 51 manufactured in the same layer as the bridging layer 50 through the wire switching holes 303. The second wire 42 is manufactured in the same layer as the bridging layer 50 and is electrically connected to the electrode outlet wire 21 through another wire switching hole 303 in the first insulation layer 30. The wire switching hole 303 on the side of the bending passage closer to the touch control area is located in the wire transition area.

Figure 10:
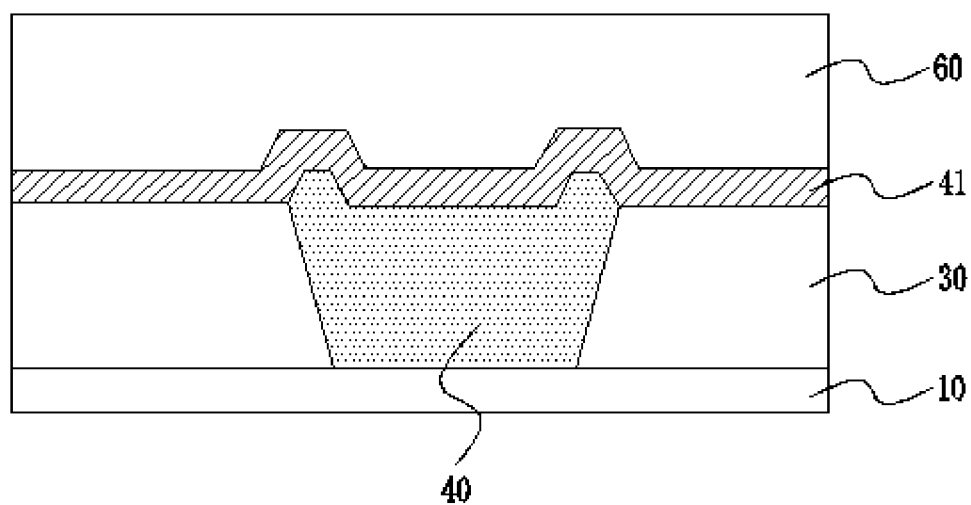
FIG. 10 is a sectional view taken along line C-C of FIG. 5.

FIG. 10 is a sectional view taken along line C-C of FIG. 5. The ground wire 41 directly enters the third routing area 303 from the second routing area 202 and through the third bending passage 3030. The ground wire 41 has a curved shape at the portion corresponding to the third bending passage 3030 for protection of the ground wire 41 when bending.

Figure 6:
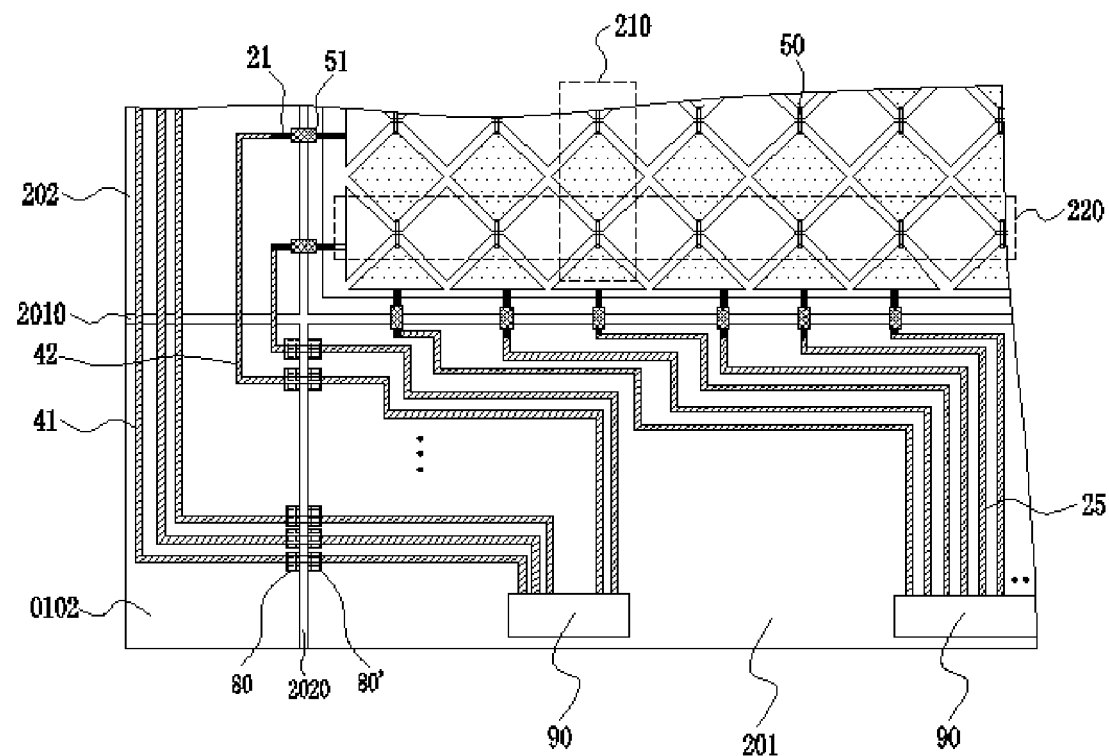
FIG. 6 is another partially schematic diagram of the touch control screen in an unbent state, according to the embodiment of the present application.

FIG. 6 is another partially schematic diagram of the touch control screen provided by an embodiment of the present application before bending. Similar to FIG. 5, the first conductive pad 80 and the second conductive pad 80' are respectively disposed in the part of the first routing area 201 on sides of the second bending passage 2020 and at positions corresponding to the signal wires (41, 42). Please refer to description of FIG. 5, FIG. 7 and FIG. 8, and repeated description is omitted here. The signal wiring further includes a first wire 25 electrically connected to the first electrode chain 210. Similar to the foregoing, the first electrode chain 210 is directly connected to the electrode outlet wire 21, the electrode outlet wire 21 on each side of the first bending passage 2010 realizes an electrical connection through the transition wire 51, and the electrode outlet wire 21 is electrically connected to the first wire 25 through the wire switching hole. The ground wire 41, the first wire 25 and the second wire 42 all extend to the bonding area 90.

The way in which the first electrode chain 210 is connected to the first wire 25 is the same as the way the second electrode chain 220 is connected to the second wire 42. The way in which the ground wire 41 and the second wire 42 go across the first bending passage 2010 is the same as what is shown in FIG. 10 and repeat description is omitted here.

Furthermore, the design of the touch control screen on the side of the fourth routing area 204 is the same as that on the side of the second routing area 202. The second wire 42 connected to the second electrode chain 220 is arranged in the second routing area 202 and the fourth routing area 204 and extends to the bonding area 90 through the first routing area 201. The bonding area 90 can be designed in many separate sections or in a single unit.

The third overlapping area 0304 between the third routing area 203 and the fourth routing area 204 is designed in a manner the same as the second overlapping area 0203 shown in FIG. 5. The fourth overlapping area 0104 between the first routing area 201 and the fourth routing area 204 is designed in a manner the same as the first overlapping area 0102 shown in FIG. 6.

By using a bending technique, both the signal wires and the bonding area in the border of the touch control screen are disposed at the back of the touch control screen's display area (touch control area), such that the touch control screen provided by the present application reduces the area the border occupies in the front of the touch control screen and realizes a full display design. The approach of the present application conceals the routing area and the bonding area at the back of the display area, and, therefore, realizes reduction of widths of the border of touch control screens to be less than 0.1 mm and a screen-to-body ratio to be more than 99%. Furthermore, because the routing areas adopt the bending approach, the requirements of the manufacturing process are relatively unrestrictive such that the demands on the equipment can be lowered and therefore the cost of production can be decreased.

In conclusion, although the present invention has been disclosed by the preferred embodiment as set forth above, the preferred embodiment is not used to limit the present invention. To a person of ordinary skill in the art, without escaping from the scope and spirit of the present invention, all modification and alternations can be made. Accordingly, the protected scope of the present invention is defined by the appended claims.

What is claimed is:

1. A touch control screen comprising:
   a flexible substrate comprising a touch control area, a routing area located around the touch control area, and a bonding area located on one side of the touch control area, wherein a plurality of bending passages is disposed between the touch control area and the routing area;
   a first electrode chain and a second electrode chain intersected with and insulated from each other and located in the touch control area;
   a signal wire electrically connected to the first electrode chain or the second electrode chain at one end, and extended to the bonding area at the other end;
   wherein parts of the flexible substrate corresponding to the routing area and the bonding area are bent in respect to the bending passages to the back of the flexible substrate at positions corresponding to the touch control area;

wherein adjacent two of the bending passages are intersected with each other, and the bending passages extend through the flexible substrate;

wherein the routing area comprises a first routing area, a second routing area, a third routing area and a fourth routing area, the bending passages comprise a first bending passage, a second bending passage, a third bending passage and a fourth bending passage, and parts corresponding to the first routing area and the third routing area on the opposite sides of the flexible substrate are bent to the back of the flexible substrate respectively through the first bending passage and the third bending passage, and other parts corresponding to the second routing area and the fourth routing area on the other sides of the flexible substrate are bent to the back of the flexible substrate respectively through the second bending passage and the fourth bending passage; and a conductive pad is disposed in the part of each of the first routing area and the third routing area on a side of each of the second bending passage and the fourth bending passage, and the conductive pad is disposed corresponding to the signal wire to realize an electrical connection of the signal wire on the side of each of the second bending passage and the fourth bending passage after bending.

2. The touch control screen as claimed in claim 1, wherein a wire transition area is disposed between the bending passages and the touch control area, a width of the wire transition area is less than or equal to 0.1 mm, and a width of each of the bending passages is between 0.2 mm-4 mm.

3. The touch control screen as claimed in claim 1, wherein a width of the vertical projection of the conductive pad on the flexible substrate is greater than a width of the vertical projection of the signal wire on the flexible substrate.

4. The touch control screen as claimed in claim 2, wherein the touch control screen comprises a touch control layer, a first insulation layer, a bridging layer and a second insulation layer stacking one another in order on the flexible substrate, and the touch control layer comprises the first electrode chain and the second electrode chain, and wherein a bridging hole is disposed in the first insulation layer on the touch control area, two adjacent first electrodes of the first electrode chain realize an electrical connection by the bridging layer through the bridging hole, a recess is disposed in the first insulation layer at a position of the bending passage, and an organic flexible insulation film layer is filled in the recess.

5. The touch control screen as claimed in claim 4, wherein the touch control screen further comprises an electrode outlet wire manufactured in the same layer as the touch control layer, and one end of the electrode outlet wire is directly connected to the first electrode chain or the second electrode chain, and the other end of the electrode outlet wire extends to the routing area, and wherein the electrode outlet wire breaks off at a position of the bending passage, a wire switching hole is disposed in the first insulation layer on each side of one of the bending passages corresponding to a position of the electrode outlet wire, and the electrode outlet wire on each side of the bending passage realizes an electrical connection by a transition wire manufactured in the same layer as the bridging layer through the wire switching holes.

6. The touch control screen as claimed in claim 5, wherein the signal wire is manufactured in the same layer as the bridging layer and is electrically connected to the electrode outlet wire through another wire switching hole in the first insulation layer.

7. The touch control screen as claimed in claim 5, wherein the wire switching hole on the side of the bending passage closer to the touch control area is located in the wire transition area.

8. A touch control screen comprising:
a flexible substrate comprising a touch control area, a routing area located around the touch control area, and a bonding area located on one side of the touch control area, wherein a plurality of bending passages is disposed between the touch control area and the routing area;

a first electrode chain and a second electrode chain intersected with and insulated from each other and located in the touch control area;

a signal wire electrically connected to the first electrode chain or the second electrode chain at one end, and extended to the bonding area at the other end;

wherein parts of the flexible substrate corresponding to the routing area and the bonding area are bent in respect to the bending passages to the back of the flexible substrate at positions corresponding to the touch control area, and the parts of the flexible substrate corresponding to the routing area have overlapping in portions at four corners corresponding to the touch control area after bending;

wherein adjacent two of the bending passages are intersected with each other, and the bending passages extend through the flexible substrate;

wherein the routing area comprises a first routing area, a second routing area, a third routing area and a fourth routing area, the bending passages comprise a first bending passage, a second bending passage, a third bending passage and a fourth bending passage, and parts corresponding to the first routing area and the third routing area on the opposite sides of the flexible substrate are bent to the back of the flexible substrate respectively through the first bending passage and the third bending passage, and other parts corresponding to the second routing area and the fourth routing area on the other sides of the flexible substrate are bent to the back of the flexible substrate respectively through the second bending passage and the fourth bending passage; and wherein a conductive pad is disposed in the part of each of the first routing area and the third routing area on a side of each of the second bending passage and the fourth bending passage, and the conductive pad is disposed corresponding to the signal wire to realize an electrical connection of the signal wire on the side of each of the second bending passage and the fourth bending passage after bending.

9. The touch control screen as claimed in claim 8, wherein a wire transition area is disposed between the bending passages and the touch control area, a width of the wire transition area is less than or equal to 0.1 mm, and a width of each of the bending passages is between 0.2 mm-4 mm.

10. The touch control screen as claimed in claim 8, wherein a width of the vertical projection of the conductive pad on the flexible substrate is greater than a width of the vertical projection of the signal wire on the flexible substrate.

11. The touch control screen as claimed in claim 9, wherein the touch control screen comprises a touch control layer, a first insulation layer, a bridging layer and a second insulation layer stacking one another in order on the flexible substrate, and the touch control layer comprises the first electrode chain and the second electrode chain, and wherein a bridging hole is disposed in the first insulation layer on the touch control area, two adjacent first electrodes of the first electrode chain realize an electrical connection by the bridging layer through the bridging hole, a recess is disposed in the first insulation layer at a position of the bending passage, and an organic flexible insulation film layer is filled in the recess.

12. The touch control screen as claimed in claim 11, wherein the touch control screen further comprises an electrode outlet wire manufactured in the same layer as the touch control layer, and one end of the electrode outlet wire is directly connected to the first electrode chain or the second electrode chain, and the other end of the electrode outlet wire extends to the routing area, and wherein the electrode outlet wire breaks off at a position of the bending passage, a wire switching hole is disposed in the first insulation layer on each side of one of the bending passages corresponding to a position of the electrode outlet wire, and the electrode outlet wire on each side of the bending passage realizes electrical an connection by a transition wire manufactured in the same layer as the bridging layer through the wire switching holes.

13. The touch control screen as claimed in claim 12, wherein the signal wire is manufactured in the same layer as the bridging layer and is electrically connected to the electrode outlet wire through another wire switching hole in the first insulation layer.

14. The touch control screen as claimed in claim 12, wherein the wire switching hole on the side of the bending passage closer to the touch control area is located in the wire transition area.

* * * * *